US011562030B2

(12) United States Patent
Kitchen

(10) Patent No.: US 11,562,030 B2
(45) Date of Patent: Jan. 24, 2023

(54) APPLYING FILTER EXPRESSIONS TO REQUESTS AT AN EDGE SERVER

(71) Applicant: CLOUDFLARE, INC., San Francisco, CA (US)

(72) Inventor: David Alexander Kitchen, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 127 days.

(21) Appl. No.: 16/192,308

(22) Filed: Nov. 15, 2018

(65) Prior Publication Data

US 2020/0159776 A1 May 21, 2020

(51) Int. Cl.
*G06F 16/9035* (2019.01)
*G06F 16/245* (2019.01)
*H04L 67/01* (2022.01)

(52) U.S. Cl.
CPC ........ *G06F 16/9035* (2019.01); *G06F 16/245* (2019.01); *H04L 67/01* (2022.05)

(58) Field of Classification Search
CPC .............. G06F 16/245; G06F 16/2465; G06F 16/2365; G06F 16/24565; G06F 16/9535
USPC ................................................ 707/736, 754
See application file for complete search history.

(56) References Cited

U.S. PATENT DOCUMENTS

| | | | | |
|---|---|---|---|---|
| 8,731,747 B2 * | 5/2014 | Desanzo | ................. | G06F 17/00 701/19 |
| 9,064,013 B1 * | 6/2015 | Gay | ..................... | G06F 16/951 |
| 9,465,837 B1 * | 10/2016 | Ross | ..................... | G06F 16/245 |
| 2002/0095459 A1 * | 7/2002 | Laux | ....................... | H04L 29/06 709/203 |
| 2003/0105732 A1 * | 6/2003 | Kagalwala | ............ | G06F 16/211 |
| 2003/0228597 A1 * | 12/2003 | Cowsert | ............ | C12N 15/1048 435/6.11 |
| 2005/0063083 A1 * | 3/2005 | Dart | ....................... | G06F 16/284 360/1 |
| 2010/0030912 A1 * | 2/2010 | Finkenzeller | ......... | H04L 1/0018 709/233 |
| 2010/0172352 A1 * | 7/2010 | Fernandez Gutierrez | ................... | H04L 45/16 370/390 |
| 2012/0320916 A1 * | 12/2012 | Sebastian | ........... | H04N 21/6375 370/390 |
| 2013/0304616 A1 * | 11/2013 | Raleigh | .................. | G06Q 40/12 705/34 |
| 2014/0244668 A1 * | 8/2014 | Barrus | .................... | G06F 16/21 707/752 |

(Continued)

*Primary Examiner* — James Trujillo
*Assistant Examiner* — Fariborz Khoshnoodi
(74) *Attorney, Agent, or Firm* — Nicholson De Vos Webster & Elliott LLP

(57) ABSTRACT

An edge server receives a request from a client device for an action to be performed on a resource. The edge server determines whether data traffic is associated with one or more filters. When the edge server determines that there are filters associated with the type of data traffic, the edge server accesses a data structure storing properties of the request. For each request property in the data structure, the edge server applies a related filter to a value of the request property and determines where the value of the request property matches an expected value. In response to determining that one or more filters match, the edge server performs actions on the request. When the edge server performs the actions on the request, the edge server sends the request to the origin server.

18 Claims, 3 Drawing Sheets

(56) References Cited

U.S. PATENT DOCUMENTS

| | | | |
|---|---|---|---|
| 2015/0007261 A1* | 1/2015 | Hecht | G06F 21/604 |
| | | | 726/1 |
| 2015/0263957 A1* | 9/2015 | Wang | H04L 47/20 |
| | | | 370/230 |
| 2015/0294013 A1* | 10/2015 | Ozer | G06Q 50/06 |
| | | | 707/754 |
| 2016/0034616 A1* | 2/2016 | Lakatos | G06F 30/20 |
| | | | 703/2 |
| 2019/0052701 A1* | 2/2019 | Rathod | H04L 51/046 |
| 2019/0114338 A1* | 4/2019 | Mineev | G06F 16/2322 |
| 2019/0236154 A1* | 8/2019 | Georgiev | G06F 16/951 |

* cited by examiner

APPLYING FILTER EXPRESSIONS TO REQUESTS AT AN EDGE SERVER

FIELD

Embodiments of the invention relate to the field of network communications; and more specifically, to applying filter expressions to requests at an edge server.

BACKGROUND

Internet hosts are concerned with maintaining high security, performance, and reliability of their hosted resources, such as websites. As the popularity of a resource increases, so does the amount of network traffic that is directed to the resource. Heavy traffic can affect the security, performance and reliability of a resource. To evaluate network traffic, rules can be used, where simple configurations can be associated with certain URL patterns. For example, rules can be established to create a redirect of a webpage matching a particular URL pattern. In some systems, packet capture (pcap) is performed. In such systems, a data packet is captured and processed offline asynchronously with the network traffic by dissecting the pcap data into traits which are then associated to the given section of the pcap data.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
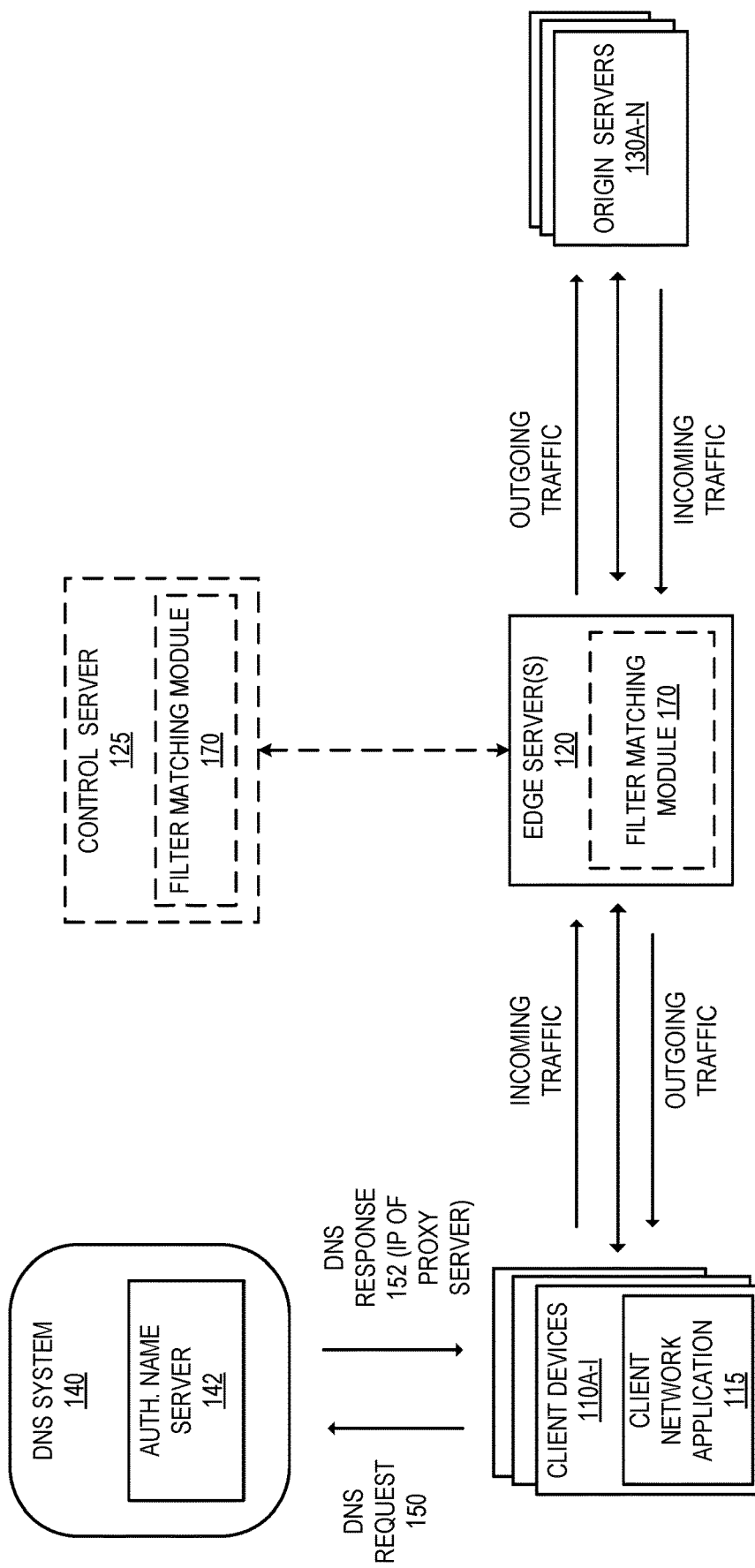
FIG. 1 illustrates an exemplary system according to some embodiments described herein.

In an embodiment, an edge server filters requests at the edge. The edge server receives a request from a client device regarding a resource that is hosted at an origin server. In some embodiments, the request is for an action to be performed on the resource. The edge server accesses a data structure associated with the request that store properties of the request. In some embodiments, the edge server generates the data structure based on analyzing the properties of the request. In some embodiments, the data structure is a table of request properties. When there are filters associated with the type of data traffic associated with the request, the edge server applies the filters to corresponding values of request properties. The edge server determines whether the value of a request property matches an expected value for the filter. In response to determining that one or more filters match, the edge server determines an action (e.g., configuration, modification, etc.) corresponding to the one or more matched filters to perform on the request. After the edge server performs the action(s) corresponding to the one or more matched filters, the edge server sends the modified or reconfigured request to the origin server.

In prior solutions that operate synchronously with the network traffic, only simple lookups can be performed to prevent delay. For example, determining if a source IP address matches, and performing an action in response. In other prior solutions, dissection of data packets is performed offline or asynchronously. Performing dissection of data packets can be time consuming, so it cannot be completed synchronously to the traffic without adding significant delay. These prior systems, therefore, sent the data packets to their destination before dissection was completed. As such, prior systems that perform offline or asynchronous dissection are detached from the original data traffic and cannot alter how the traffic was processed.

Embodiments of the invention provide many technical advantages, in addition to addressing the deficiencies of previous solutions. Because layer 4 through layer 7 systems and applications involved in serving traffic already has information about the traffic. For example, TCP knows the IP address, the TLS layer knows the certificate that was used, HTTP knows the host name, and the web proxy has made sense of the path. Because the majority of request properties are already known to the various applications in the stack, the entire dissection stage is not required. The table of request properties can be initially composed of the primitive properties that each of the applications knows about, thereby eliminating the need to perform an offline dissection process. Performing in this manner allows the system to perform a real-time analysis of the data traffic and avoids significant offline processing. This provides the technical advantage by utilizing computing resources more efficiently in the handling of data traffic. Further, applying the filters on the data traffic in real-time allows the edge server to perform actions, including making modifications to the request, prior to sending the request to an origin server and/or before/after the content of the request is retrieved from a cache.

In addition, performing the filtering and any action to the request at the edge server can save bandwidth throughout a network by sending the request in the appropriate configuration and/or to the appropriate destination. By modifying or redirecting requests to the appropriate destination, computing resources of the origin server are saved from preventing the origin server from having to process these requests.

Further, because the edge server applies the filter expressions using a small set of properties of the network traffic, the data structure of request properties and the matching can be performed in a high traffic environment as the network traffic is received by the edge server and prior to the edge server sending the network traffic to its destination.

FIG. 1 illustrates an exemplary network architecture that use embodiments described herein. The service illustrated in FIG. 1 includes edge server(s) 120 that are situated between client computing devices 110A-I and origin server(s) 130A-N. In one embodiment, edge server(s) 120 are reverse proxy servers. In one embodiment, certain network traffic is received and processed through edge server(s) 120. For example, web traffic (e.g., HTTP requests/responses, HTTPS requests/responses, SPDY requests/responses, HTTP/2 requests, responses, etc.) for domains handled by origin servers 130A-N may be received and processed at edge server(s) 120. In one embodiment, domain owners are customers of the cloud-based edge service and certain network traffic for their websites are received and processed at edge server(s) 120.

Client devices 110A-I are computing devices (e.g., laptops, workstations, smartphones, palm tops, mobile phones, tablets, gaming systems, set top boxes, wearable devices, electronic devices, etc.) that are capable of transmitting and/or receiving network traffic. Each of client devices 110A-I executes client network application 115 that is capable of transmitting and/or receiving network traffic. For example, client network application 115 may be a web browser or other application that can access network resources (e.g., web pages, images, word processing documents, PDF files, movie files, music files, or other computer files). Client devices 110A-I may each make DNS request 150 to DNS system 140 for a particular hostname and receive DNS response 152 that includes an IP address of edge server(s) 120.

Origin servers 130A-N are computing devices that may serve and/or generate network resources (e.g., web pages, images, word processing documents, PDF files movie files, music files, or other computer files). Origin server 130A-N may also be another edge server to the server that serves and/or generates network resources. Although not illustrated in FIG. 1, it should be understood that the network resources of origin servers 130A-N may be stored separately from the device that responds to the requests. Some of origin servers 130A-N may handle multiple domains that resolve to edge server(s) 120. For example, a single origin server (e.g., origin server 130A) may handle multiple domains owned by the same domain owner or different domain owners through use of virtual hosting. In one embodiment, the virtual hosting is name-based virtual hosting where multiple websites (domains), which may or may not be owned or operated by the same domain owner, are hosted on the same IP address.

DNS system 140 is used to refer to the DNS system as a whole and includes multiple DNS servers to resolve DNS requests. As illustrated, DNS system 140 includes authoritative name server 142, which is an authoritative name server for the service. Authoritative name server 142 may be the authoritative name server for the domains hosted at origin servers 130A-N. It should be understood that DNS system 140 may include more DNS servers (e.g., preferred domain servers, top-level domain name servers, or other domain servers) than illustrated. It should also be understood that there may be multiple authoritative web servers for the service and they may be geographically distributed.

Although not illustrated in FIG. 1, in one embodiment the service includes multiple nodes (referred herein as "edge service nodes"). Each edge service node may include any of one or more edge servers, one or more control servers, one or more DNS servers (e.g., one or more authoritative name servers), and one or more other pieces of networking equipment (e.g., one or more routers, switches, hubs, etc.). The edge service node may be part of the same physical device or multiple physical devices. For example, the edge server(s), control server(s), and DNS server(s) may be virtual instances running on the same physical device or may be separate physical devices. Each edge service node may be part of a data center or a collocation site.

The service may also include control server 125, which may be owned or operated by the service. In one embodiment, control server 125 provides a set of tools and interfaces for customers (e.g., domain owners) to configure security settings of the service. In some embodiments, control server 125 may be used to send a command to edge server(s) 120 to perform the application of filters to requests described herein. For example, control server 125 may receive a command from a website owner of a website (e.g., resource) handled by an origin server (e.g., origin server 130A) to apply a set of filters to requests directed to particular resources (or types of resources) associated with origin server 130A. In some embodiments, filtering is enabled as a result of control server 125 receiving an indication of a selection to enable filtering (e.g., via a button selection or a toggle switched to an "on" or "enabled" position). In some embodiments, the selection of the toggle switch causes edge server(s) 120 to modify code associated with a resource to enable filtering. Similarly, filtering may be disabled as the result of control server 125 receiving an indication of a selection to disable filtering (e.g., via a button selection or a toggle switch of the button or the toggle switched to an "off" or "disabled" position).

In some embodiments, the service includes multiple edge servers that are geographically distributed. For example, in some embodiments, the service uses multiple edge service nodes that are geographically distributed to decrease the distance between requesting client devices and content. The authoritative name servers may have a same anycast IP address and the edge servers may have a same anycast IP address. As a result, when a DNS request is made, the network transmits the DNS request to the closest authoritative name server (in terms of the routing protocol metrics). That authoritative name server then responds with one or more IP addresses of one or more edge servers within the edge service node. Accordingly, a visitor will be bound to that edge server until the next DNS resolution for the requested hostname (according to the TTL ("time to live") value as provided by the authoritative name server). In some embodiments, instead of using an anycast mechanism, embodiments use a geographical load balancer to route traffic to the nearest edge service node.

To perform the filtering of requests, the service analyzes requests received by edge server(s) 120 from client devices (e.g., client devices 110A-I) or client network application (e.g., client network application 115) operating on client devices. For instance, control server 125 and/or edge server(s) 120 include filter matching module 170 that is configured to receive requests access and/or modify resources hosted by origin servers 130A-N, retrieve and/or analyze properties of the request, and perform action on the requests prior to sending the request to origin servers 130A-N.

Figure 2:
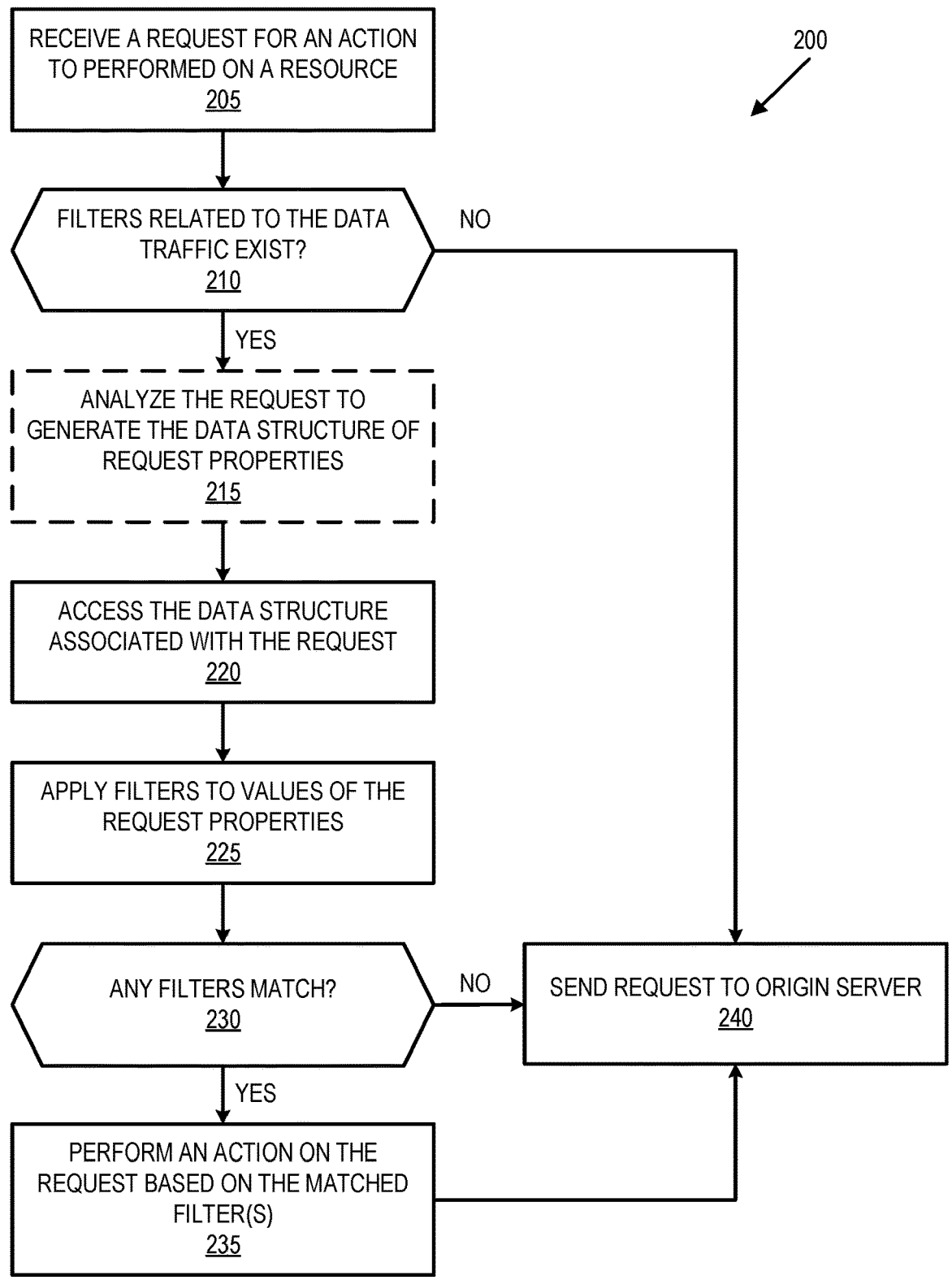
FIG. 2 is a flow diagram that illustrates exemplary operations for applying filter expressions to requests at edge servers, according to an embodiment.

FIG. 2 is a flow diagram 200 that illustrates exemplary operations for applying filter expressions to requests at edge servers according to an embodiment. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2. The operations of FIG. 2 are described as being performed by an edge server (e.g., edge server 120). However, in some embodiments, the operations are performed by another device (e.g., control server 125, origin servers 130A-N, etc.). In some embodiment, the operations are performed by filter matching module 170 operating on edge server(s) 120, control server 125, or origin servers 130A-N.

At operation 205, an edge server (e.g., one edge server from set of edge servers 120) receives a request for a resource. In one embodiment, the request is for an action to be performed on the resource. For example, edge server 120 receives a HTTP "GET" request to access a resource hosted by an origin server (e.g., origin server 130A). In one embodiment, the request is received by edge server 120 as a result of a DNS for the hostname resolving to an IP address of edge server 120 instead of resolving to an IP address of origin server 130A. In one embodiment, the requested resource is an HTML page located at, e.g., www.example.com. In one embodiment, edge server 120 receives the request for the resource from client network application 115 (e.g., a browser) operating on a client device (e.g., client device 110A).

At operation 210, edge server 120 determines whether there are any filters related to the data traffic. For example, a particular type of data traffic (e.g., HTTP) is associated with a unique set of filters versus set of filters for other types of data traffic, while some data traffic does not have any filters. In one embodiment, edge server 120 identifies the type of data traffic associated with the request. In one embodiment, edge server 120 performs a lookup operation, on a local or remote database, to determine whether there are any filters related to the identified type of data traffic. When edge server 120 determines that there are filters related to the data traffic to be evaluated, the flow proceeds to operation 220, or optionally to operation 215. When edge server 120 determines that there are no filters related to the data traffic to be evaluated, a data structure of request properties is not accessed and/or is not generated for the request, and the flow proceeds to operation 240.

At operation 215, edge server 120 optionally analyzes the request to generate the data structure of request properties. In some embodiments, edge server 120 bypasses operation 215 when the data structure of request properties for the request already exists and is accessible by the edge server 120. For example, if the data structure of request properties was previously generated (e.g., by another application). In other embodiment, edge server 120 performs operation 215 even when the data structure of request properties for the request was previously generated. In such embodiments, edge server 120 may be able to determine additional information regarding the request that would not have been determined when the data structure of request properties for the request was previously generated. For example, when edge server 120 receives a response from origin server 130A, edge server 120 can determine additional properties of the response, either upon receiving the response or prior to sending the response to client device 110A.

In one embodiment, the data structure is a table having a plurality of rows, each row including, at least, a property type and a value. In one embodiment, each entry in the table is immutable—once added to the table, a request property entry cannot be modified. In some embodiments, duplicate request properties are rejected and not entered into the table. In one embodiment, edge server populates the values for the request properties based on an analysis of the request, including information related to the source and destination of the request. An example request properties table for an HTTP request is produced below:

In one embodiment, the request properties in the table can be one of three types: native properties, derived properties, and computed properties. In one embodiment, native (or primitive) properties include raw values obtained from HTTP headers and request information, and require minimal to no normalization. In one embodiment, derived properties include properties that are the results of transformations. Transformations include whitespace removal, lowercasing, or concatenation. For example, a punycode version of the domain name to support more consistent filter matching against international domain names. In one embodiment, computed properties include properties that are the result of calls to other function, networks, or databases with one or more existing properties provided as an input. For example, computed properties include calls to system to calculate threat scores or to retrieve counters. Example derived properties are produced below:

| Request Property Type | Field Type | Request Property Value |
| --- | --- | --- |
| cf.threat_score | Number | 57 |
| cf.threat_trust_score | Number | 90 |

In one embodiment, the range of valid request property values for the cf.threat_score can be defined as the range from 0 to 100, where 0 equals no risk and 100 equals the highest level of risk. In one embodiment, the range of valid request property values for the cf.threat_trust_score can be defined as the range from 0 to 100, where 0 equals no trust in the user agent and client, and 100 equals full trust in the user agent and client.

In operation 220, edge server 120 accesses the data structure associated with the request. In one embodiment, edge server 120 retrieves the data structure associated with the request using a request identifier. In one embodiment, the device that generates the data structure associated with the request assigns a unique request identifier to associate the request with the data structure. In one embodiment, edge server 120 retrieves the data structure associated with the request from a memory portion accessible and/or associated with edge server 120.

In operation 225, edge server 120 applies the filters related to the request to the values of the request properties obtained from the data structure associated with the request.

| Request Property Type | Field Type | Request Property Value |
| --- | --- | --- |
| ssl | Boolean | true |
| http.host | | www.hostwebsite.com |
| http.referer | String | |
| http.request.method | String | GET |
| http.request.uri | String | /ddos/?expand=sidemenu |
| http.request.uri.path | String | /ddos/ |
| http.request.full_uri | String | https://www.hostwebsite.com/ddos/?expand=sidemenu |
| http.content_type | String | ^image/.*$ |
| http.user_agent | String | Mozilla/5.0 (X11; Linux x86_64) AppleWebKit/537.36 (KHTML, like Gecko) Chrome/62.0.3202.89 Safari/537.36 |
| ip.addr | IP Address | 8100:97c0:1000:2a06:32f6:74ef:2cd3:e3 |
| ip.geoip.asnum | Number | 13335 |
| ip.geoip.country | String | GB |
| tcp.port | Number | 443 |

In one embodiment, edge server 120 applies all filters related to the type of data traffic to the values of the request properties. In some embodiments, edge server 120 applies filters to the values of the request properties even when there is not a corresponding action to perform if the filter is matched or triggered.

In one embodiment, examples of filters include the expressions: (1) http.request.path contains "/news", (2) http.cookie matches ^.*editor=.*$ and ip.addr=192.0.32.10, and (3) not ssl.

In operation 230, edge server 120 determines whether one or more of the filters matched or were triggered. In one embodiment, edge server 120 analyzes the request properties against the applicable filters. For example, given a GET request from IP address 1.2.3.4 for a HTTP page with a path that includes "/news/article/4576," filter (1) described above matches. In another example, given a GET request from IP address 192.0.32.10 with cookie of editor=543 for a HTTP page with a path that includes "/news/article/4576," filter (1) and (2) described above match. In another example, given a GET request from IP address 192.0.32.10 with cookie of editor=543 for a HTTP page at http://www.example.org/news/article/4576, filters (1), (2), and (3) match.

When edge server 120 determines that one or more filters matched after being applied to the values of the request properties, the flow proceeds to operation 235. When edge server 120 determines that no filters matched after being applied to the values of the request properties, the flow proceeds to operation 240.

In operation 235, edge server 120 performs an action on the request based on the one or more matched filters. In one embodiment, edge server 120 identifies the action associated with each of the one or more matched filters. In one embodiment, edge server 120 accesses a data structure storing information regarding the action(s) associated with a filter. For example, edge server 120 determines an identifier associated with each matched filter and uses the identifier to identify each action associated with each matched filter from a table storing matched filter actions.

In one embodiment, edge server 120 performs one of the following actions: modify expiry headers (e.g., modify browser cache instructions), enable tracing (e.g., enable additional request chain logging), enable real user measurement (e.g., browser timing), change origin destination (e.g., send some traffic to a different backend origin), modify origin connection criteria (e.g., changing the host name used to connect to an origin), block or whitelist traffic, adjust the security level (e.g., modify the threshold at which traffic is issued a CAPTCHA), authenticate traffic, minify response bodies (e.g., remove whitespace from HTML, JS and CSS), compress images, perform an A/B test, enable an Edge Worker script (e.g., add V8 JS processing to the request or response), force the response into the CDN cache, and modify the request URI or path (e.g., perform Apache mod_rewrite and mod_redirect).

In one embodiment, edge server 120 determines an action to perform on the request in response to the detection of one or more matched filters. For example, when edge server 120 determines from the request that: (1) http.request.full_uri matches "www.example.org/static" and (2) http.content_type matches "^image/.*$", the associated action is to "cache images for one month."

Continuing the example from operation 230 above, the filters can be associated with the following actions:

| Matched Filter | Action | Priority |
|---|---|---|
| (1) http.request.path contains "/news" | use the content delivery network (CDN) cache instead of the browser cache | Default |
| (2) http.cookie matches ^.*editor=.*$ and ip.addr = 192.0.32.10 | skip the cache so that the latest version of content on the web site is presented to editors | High |
| (3) not ssl | redirect to HTTPS | Default |

In one embodiment, edge server 120 determines that two actions for two different filters conflict. In such embodiments, edge server 120 determines a pre-established priority level for each of the actions. In one embodiment, an action can be designated as having a low priority, default priority, or a high priority. In one embodiment, in response to determining that two actions conflict, edge server 120 determines which action has a higher priority and performs the action with the higher priority. Given the example where filters (1) and (2) match, as the associated action conflict (e.g., one directs the use of a cached version and the other directs skipping any cache), edge server 120 would determine which action has a higher priority.

In another embodiment, each filter is assigned a priority value for use in conflict resolution. For example, the priority values can be expressed as int32 values. As filter expressions increase in complexity, using int32 values for filter priorities allows edge server 120 to efficiently determine how to perform actions for those filters that match a received request.

In operation 240, edge server 120 sends the request to the origin server (e.g., origin server 130A). In one embodiment, edge server 120 sends the original request received in operation 205, e.g., when there are no filters related to the data traffic or any existing filters related to the data traffic did not match any of the properties of the request. In one embodiment, edge server 120 sends the request that has been modified based on the action associated with a matched filter.

In some embodiments, edge server 120 applies the filters to the request properties when edge server 120 receives a request for the resource from client network application 115 (e.g., a browser) operating on a client device (e.g., client device 110A). In other embodiments, edge server 120 applies the filters to the request properties when edge server 120 send a request for the resource to an origin server (e.g., origin server 130A). In other embodiments, edge server 120 applies the filters to the request properties when edge server 120 receives a response to the request from the origin server and/or when edge server 120 sends the response to the request to client device 110A. In such embodiments, the data structure of request properties also include properties of the response received from origin server 130A.

In one embodiment, edge server 120 optimizes the filters and how the filters are applied to requests. In one embodiment, edge server 120 optimizes the filters based on the results of previous applications of the filters to network traffic (e.g., requests, responses, etc.). Performance metrics can include the execution time, resource costs, number of match operations, etc. In one embodiment, edge server 120 uses the performance metrics to determine what filters to apply and an optimal order of application of the filters to network traffic.

In one embodiment, edge server 120 further optimizes the filters based on the results of previous applications of the filters through memoization, in which all filter expressions in a set are converted to trees, such as abstract syntax trees (ASTs) or similar types of data structures, and each part of a filter expression is evaluated and cached, and thus multiple filter expressions that share common parts will be able to use the cache. By avoiding application of the same filter in multiple filter expressions on a request property multiple times, edge server 120 can reduce the amount of processing and compute that would typically be used to apply all part of all filter expressions.

Figure 3:
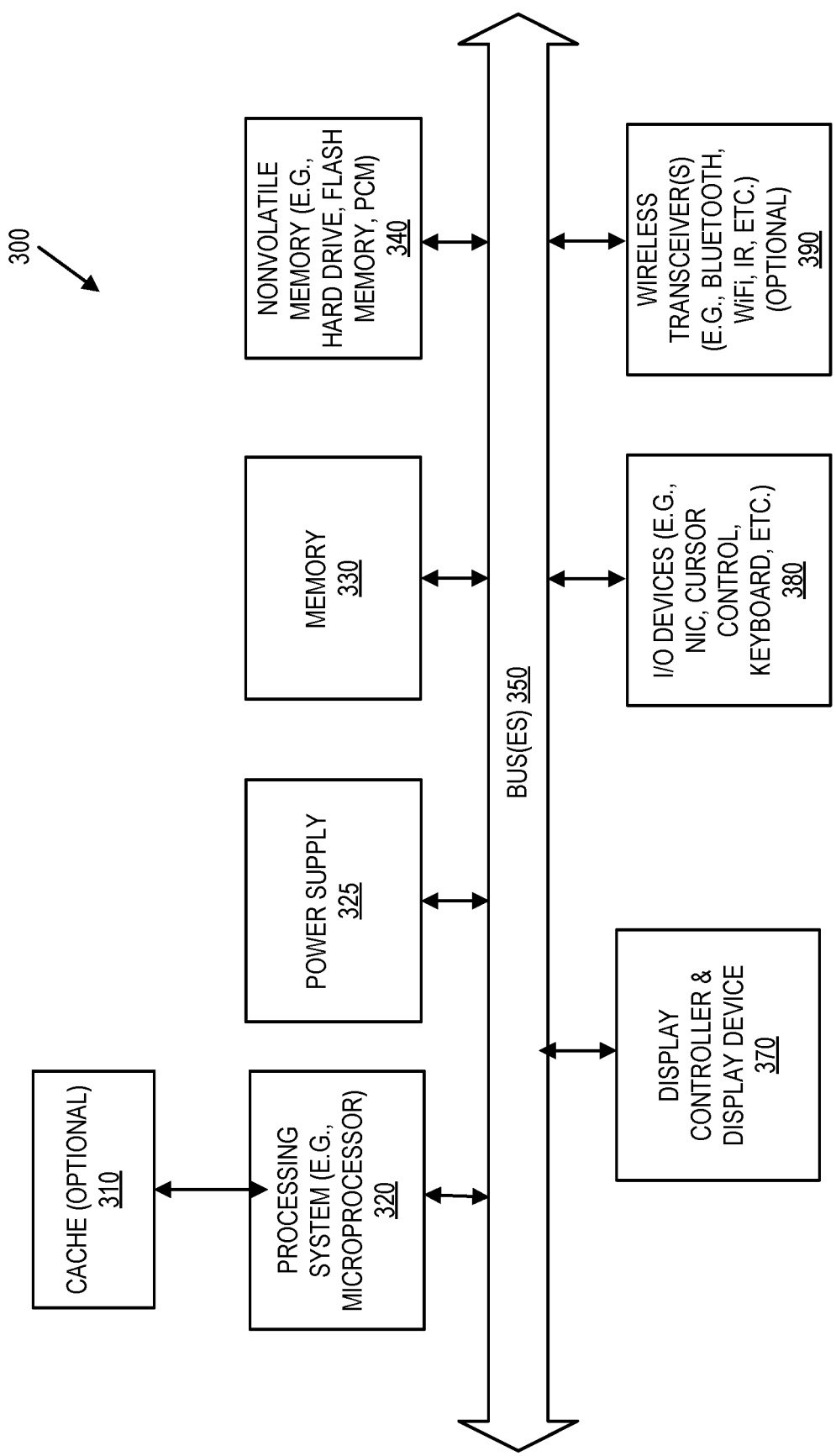
FIG. 3 is a block diagram illustrating a data processing system that can be used in an embodiment.

As illustrated in FIG. 3, the computer system 300, which is a form of a data processing system, includes the bus(es) 350 which is coupled with the processing system 320, power supply 325, memory 330, and the nonvolatile memory 340 (e.g., a hard drive, flash memory, Phase-Change Memory (PCM), etc.). The bus(es) 350 may be connected to each other through various bridges, controllers, and/or adapters as is well known in the art. The processing system 320 may retrieve instruction(s) from the memory 330 and/or the nonvolatile memory 340 and execute the instructions to perform operations described herein. The bus 350 interconnects the above components together and also interconnects those components to the display controller & display device 370, Input/Output devices 380 (e.g., NIC (Network Interface Card), a cursor control (e.g., mouse, touchscreen, touchpad, etc.), a keyboard, etc.), and the optional wireless transceiver(s) 390 (e.g., Bluetooth, Wi-Fi, Infrared, etc.). In one embodiment, the client device, caching system, and/or service device described herein may take the form of the computer system 300.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving a request from a client device for an action to be performed on a resource that is hosted at an origin server;
   in response to receiving the request, identifying a first type of data traffic associated with the request;
   determining a first set of filters from a plurality of sets of filters, the first set of filters associated with the first type of data traffic associated with the request;
   accessing a data structure associated with the request, the data structure storing properties of the request, the properties of the request including native properties, derived properties, and computed properties;
   for each property of the request in the data structure, applying a related filter from the first set of filters to a value of the property in the data structure, and determining whether the value of the property matches an expected value;
   in response to determining that one or more filters match, performing actions on the request corresponding to the one or more matched filters based on priority levels of the one or more matched filters including:
      performing a lookup process to determine actions associated with each of the one or more matched filters, and
      modifying a configuration of the request based on the determined actions; and
   sending the request to the origin server.

2. The method of claim 1, further comprising:
analyzing the request to identify the properties of the request;
generating the data structure associated with the request based on the analysis, wherein the data structure is a table, the table including entries generated based on the identified properties of the request.

3. The method of claim 2, wherein generating the data structure associated with the request based on the analysis comprises:
sending identified properties to an external server; and
receiving a derived property for inclusion in the data structure, the derived property generated by the external server based on the sent identified properties.

4. The method of claim 2, wherein the identified properties of the request include one or more of: an IP address, a host field, a request type, and a threat score.

5. The method of claim 1, wherein an action of the determined actions is to authenticate the request when the value associated with the property is a destination address matching the expected value of a matched filter.

6. The method of claim 1, further comprising:
in response to performing the actions on the request, identifying a new property of the request; and
appending a new entry in the data structure associated with the request based on the identified new property.

7. A non-transitory machine-readable storage medium that provides instructions that, when executed by a processor, cause said processor to perform operations comprising:
receiving a request from a client device for an action to be performed on a resource that is hosted at an origin server;
in response to receiving the request, identifying a first type of data traffic associated with the request;
determining a first set of filters from a plurality of sets of filters, the first set of filters associated with the first type of data traffic associated with the request;
accessing a data structure associated with the request, the data structure storing properties of the request, the properties of the request including native properties, derived properties, and computed properties;
for each property of the request in the data structure, applying a related filter from the first set of filters to a value of the property in the data structure, and determining whether the value of the property matches an expected value;
in response to determining that one or more filters match, performing actions on the request corresponding to the one or more matched filters based on priority levels of the one or more matched filters including:
performing a lookup process to determine actions associated with each of the one or more matched filters, and
modifying a configuration of the request based on the determined actions; and
sending the request to the origin server.

8. The non-transitory machine-readable storage medium of claim 7 that provides instructions that, when executed by the processor, cause the processor to further perform operations comprising:
analyzing the request to identify the properties of the request;
generating the data structure associated with the request based on the analysis, wherein the data structure is a table, the table including entries generated based on the identified properties of the request.

9. The non-transitory machine-readable storage medium of claim 8, generating the data structure associated with the request based on the analysis comprises further comprises:
sending identified properties to an external server; and
receiving a derived property for inclusion in the data structure, the derived property generated by the external server based on the sent identified properties.

10. The non-transitory machine-readable storage medium of claim 8, wherein the identified properties of the request include one or more of: an IP address, a host field, a request type, and a threat score.

11. The non-transitory machine-readable storage medium of claim 7, wherein an action of the determined actions is to authenticate the request when the value associated with the property is a destination address matching the expected value of a matched filter.

12. The non-transitory machine-readable storage medium of claim 7 that provides instructions that, when executed by the processor, cause the processor to further perform operations comprising:
in response to performing the actions on the request, identifying a new property of the request; and
appending a new entry in the data structure associated with the request based on the identified new property.

13. An apparatus, comprising:
a processor;
a non-transitory machine-readable storage medium coupled with the processor that stores instructions that, when executed by the processor, cause said processor to perform the following:
receive a request from a client device for an action to be performed on a resource that is hosted at an origin server;
in response to receiving the request, identify a first type of data traffic associated with the request;
determine a first set of filters from a plurality of sets of filters, the first set of filters associated with the first type of data traffic associated with the request;
access a data structure associated with the request, the data structure storing properties of the request, the properties of the request including native properties, derived properties, and computed properties;
for each property of the request in the data structure, apply a related filter from the first set of filters to a value of the property in the data structure, and determine whether the value of the property matches an expected value;
in response to determining that one or more filters match, perform actions on the request corresponding to the one or more matched filters based on priority levels of the one or more matched filters including:
performing a lookup process to determine actions associated with each of the one or more matched filters, and
modifying a configuration of the request based on the determined actions; and
send the request to the origin server.

14. The apparatus of claim 13, wherein the instructions further cause said processor to perform the following:
analyze the request to identify the properties of the request;
generate the data structure associated with the request based on the analysis, wherein the data structure is a table, the table including entries generated based on the identified properties of the request.

15. The apparatus of claim 14, wherein generating the data structure associated with the request based on the analysis comprises:
   sending identified properties to an external server; and
   receiving a derived property for inclusion in the data structure, the derived property generated by the external server based on the sent identified properties.

16. The apparatus of claim 14, wherein the identified properties of the request include one or more of: an IP address, a host field, a request type, and a threat score.

17. The apparatus of claim 13, wherein an action of the determined actions is to authenticate the request when the value associated with the property is a destination address matching the expected value of a matched filter.

18. The apparatus of claim 13, wherein the instructions further cause said processor to perform the following:
   in response to performing the actions on the request, identify a new property of the request; and
   append a new entry in the data structure associated with the request based on the identified new property.

* * * * *